United States Patent [19]
Herzan et al.

[11] Patent Number: 5,255,699
[45] Date of Patent: Oct. 26, 1993

[54] NIPPLE WITH INTEGRAL CROSSBAR ACTUATOR AND CHECK VALVE

[75] Inventors: Eugene H. Herzan, Minnetonka; Dennis C. Giesler, Maple Grove, both of Minn.

[73] Assignee: Parker-Hannifin Corporation, Cleveland, Ohio

[21] Appl. No.: 986,376

[22] Filed: Dec. 7, 1992

[51] Int. Cl.⁵ ............................................. F16L 37/28
[52] U.S. Cl. ..................................... 137/1; 137/614.05
[58] Field of Search ............... 137/614, 614.02, 614.04, 137/614.05, 1; 251/149.6

[56] References Cited

U.S. PATENT DOCUMENTS

| | | | |
|---|---|---|---|
| 2,735,696 | 2/1956 | Omon et al. | 137/614.05 X |
| 3,236,251 | 2/1966 | Hansen | 137/614.05 |
| 3,245,423 | 4/1966 | Hansen et al. | 251/149.6 X |
| 3,348,575 | 10/1967 | Simak | 137/614.05 |
| 3,500,859 | 3/1970 | Pearson | 137/614.05 |
| 3,537,476 | 11/1970 | Evans | 137/614 |
| 3,715,099 | 2/1973 | Shendare | 251/149.6 X |
| 4,063,708 | 12/1977 | Smith | 251/149.6 X |
| 4,200,121 | 4/1980 | Walter et al. | 137/614.05 |
| 4,378,028 | 3/1983 | Weber et al. | 137/614.05 |
| 4,388,947 | 6/1983 | Steuerwald | 137/614.06 |
| 4,509,554 | 4/1985 | Failla | 137/614.05 |
| 4,745,948 | 5/1988 | Wilcox et al. | 137/614.05 |
| 4,932,431 | 6/1990 | Silagy | 251/149.6 X |

Primary Examiner—Martin P. Schwadron
Assistant Examiner—Kevin L. Lee
Attorney, Agent, or Firm—Renner, Otto, Boisselle & Sklar

[57] ABSTRACT

A nipple characterized by an integral crossbar actuator and check valve. When a mating coupler at atmospheric pressure is connected to the nipple, the crossbar actuator functions to open a poppet valve in the mating coupler independently of the check valve. With the coupler fully connected to the nipple, pressurized media is supplied to the coupler to commence media transfer. When the pressure in the coupler exceeds the pressure behind the nipple's check valve, the check valve will open and the transfer of media will occur. Conversely, the check valve will close and prevent any further transfer of media when the supply to the coupler is ceased and the coupler is vented. The coupler can then be disconnected from the pressurized nipple. The nipple and coupler form a coupling system, and the nipple may be used to retrofit existing systems wherein valved nipples and check valves are used on a pressure side of the system.

20 Claims, 2 Drawing Sheets

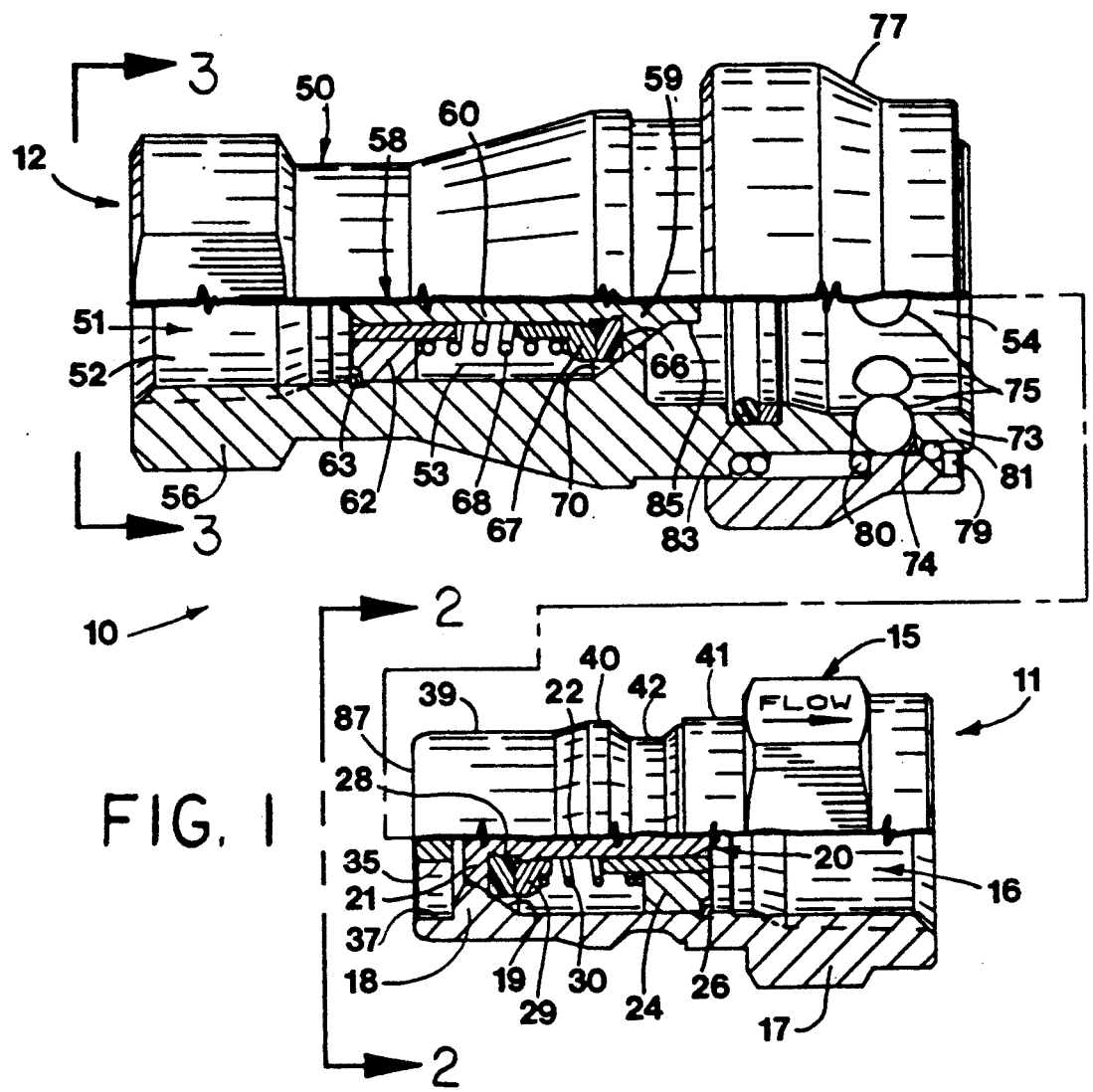
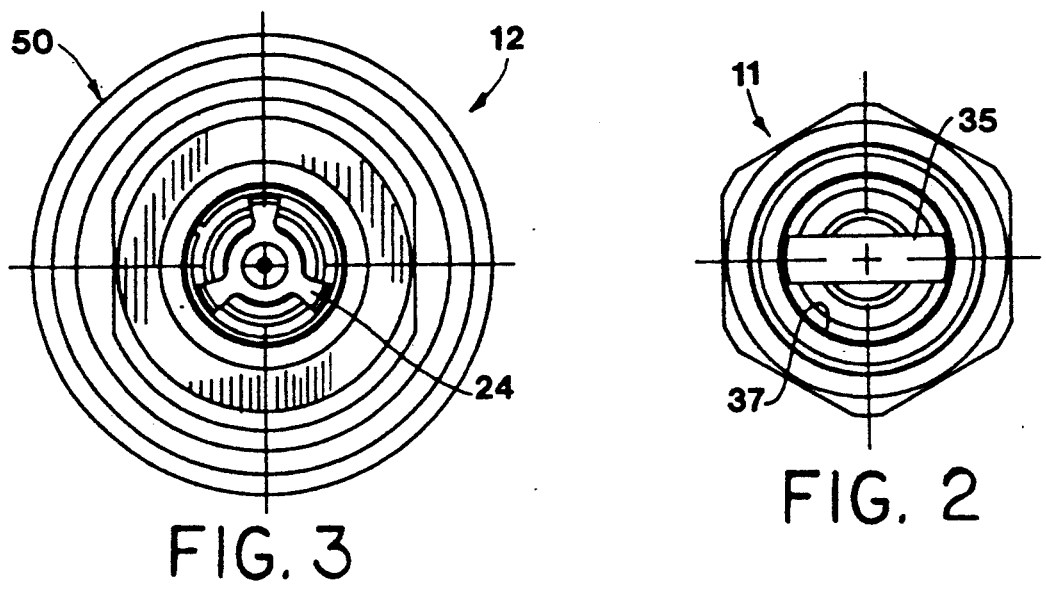
FIG. 1
FIG. 2
FIG. 3

NIPPLE WITH INTEGRAL CROSSBAR ACTUATOR AND CHECK VALVE

The invention herein described relates generally to coupling devices for fluid systems and, more particularly, to valved couplings that are readily separable and connectable even when one of the mating couplings is under pressure.

BACKGROUND

Quick-connect valved coupling devices for fluid systems commonly include a male coupling and a female coupling which are also herein referred to as a nipple and coupler, respectively. The male and female couplings are adapted to be interengaged with one another for interconnecting fluid conduits to which they are attached. Each coupling may be provided with a poppet valve which automatically closes the flow passage through the coupling when the male and female couplings are disconnected. When the male and female couplings are connected together, the poppet valves engage one another automatically to open the flow passages in the couplings for transfer of fluid through the mated couplings.

Some high pressure applications, such as compressed natural gas (CNG) vehicle refueling applications, require connection of a mating coupler at atmospheric pressure to a nipple even when the nipple is under pressure. A currently used prior art practice is to locate a check valve in line behind the nipple, thereby to isolate the poppet valve in the nipple from the pressure in the fluid conduit to which the nipple and check valve are attached. A problem arises when the check valve leaks as pressure can then become trapped behind the nipple's poppet valve. This trapped pressure may prevent connection of the mating coupler to the nipple. Another problem is that mechanical opening and/or closing of the nipple's poppet valve under high pressure exposes the valve seal therein to high forces and stresses which may cause the valve seal to chip, tear or crack and thereby reduce its life expectancy.

SUMMARY OF THE INVENTION

The present invention provides a nipple to which a mating coupler can be connected at atmospheric pressure whether or not the nipple is pressurized. The nipple is characterized by an integral poppet valve actuator and check valve. When a mating coupler at atmospheric pressure is connected to the nipple, the poppet valve actuator in the form of a crossbar functions to open a poppet valve in the mating coupler. With the coupler fully connected to the nipple, pressurized media may be supplied to the coupler to commence media transfer. When the pressure in the coupler exceeds the pressure behind the nipple's check valve, the check valve will open and the transfer of media will occur. Conversely, the check valve will close and prevent any further transfer of media when the supply to the coupler is ceased and the coupler is vented. The coupler may then be disconnected from the pressurized nipple.

As will be appreciated by those skilled in the art, a nipple according to the invention has both economic and functional advantages. The nipple functions as a substitute for the prior art practice of employing both a quick action nipple and a check valve, inasmuch as the nipple according to the invention has a check valve uniquely integrated therein and a separate actuator for opening the poppet valve in the mating coupler. From a functional standpoint, the nipple avoids the problem of pressure trapped behind a poppet valve in that the mating coupler can be connected to the nipple at atmospheric pressure whether or not the nipple's check valve is under pressure because the separate actuator operates to open the poppet valve in the coupler independently of the check valve. Moreover, the check valve will only allow media flow from the coupler to the nipple, and reliance on pressure equalization to open and close the check valve will extend valve seal life by minimizing exposure to the damaging forces that arise in prior art nipples wherein the valve seals are mechanically opened under pressure and thereby exposed to high forces and stresses.

With the foregoing in mind, the present invention provides a novel quick-connect nipple for connecting with a quick-connect coupler including a normally closed poppet valve and a locking mechanism for locking the nipple in the coupler upon axial insertion of the nipple into the coupler. The nipple comprises a nipple body having a flow passage extending axially between front and rear ends thereof, a check valve mounted in the nipple body for movement between open and closed positions, and a poppet valve actuator separate from the check valve for mechanically engaging the poppet valve of the coupler upon insertion of the nipple into the coupler so as to open the coupler's poppet valve independently of the nipple's check valve. The nipple body is configured with means engageable by the locking mechanism of the coupler for releasably holding the nipple body in the coupler.

According to a preferred embodiment, the poppet valve actuator includes an abutment member fixed in the nipple body forwardly of the check valve in the nipple's flow passage and, more particularly, a crossbar that transaxially extends centrally across the front end of the nipple's flow passage. The crossbar preferably is fixed in a counterbore substantially flush with the front face of the nipple body. The rearward end of the counterbore is formed by a radially inwardly projecting throat that surrounds the nipple's flow passage and forms at its back side an annular valve seat for the check valve. The check valve preferably is of the type that has a resilient annular seal for sealingly engaging the valve seat and a rigid head portion for engaging the valve seat to prevent overcompression of the annular seal. The head portion and valve seat may be correspondingly tapered as is preferred, and the check valve is biased towards its closed position sealing against the valve seat.

According to another aspect of the present invention, there is provided a quick-connect coupling system comprising the above nipple and a coupler, the coupler including a normally closed poppet valve and a locking mechanism for locking the nipple in the coupler upon axial insertion of the nipple into the coupler. The coupler preferably is of the type including an annular interface seal for sealing between the nipple body and coupler when connected together.

According to still another aspect of the invention, there is provided a method of retrofitting a quick-connect coupling system including a coupler connected to a supply line and a nipple connected via a check valve to a pressurized conduit, the coupler and nipple each including a poppet valve mechanically opened by the poppet valve in the other when the coupler and nipple are interengaged, the method comprising the step of replacing the nipple with a conversion nipple comprising a nipple body having a flow passage extending axially between front and rear ends thereof, a check valve mounted in the nipple body for movement between open and closed positions, and a poppet valve actuator separate from the check valve for mechanically engaging the poppet valve of the coupler upon insertion of the nipple into the coupler so as to open the coupler's poppet valve independently of the check valve, and the nipple body being configured for engagement by a locking mechanism in the coupler for releasably holding the nipple body in the coupler.

The foregoing and other features of the invention are hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

FIG. 1 is a half elevational, half sectional view of a coupling system with the nipple and coupler thereof disconnected.

FIG. 2 is a front end view of the nipple of FIG. 1 taken from line 2—2 of FIG. 1.

FIG. 3 is a rear end view of the coupler of FIG. 1 taken from the line 3—3 of FIG. 1.

DETAILED DESCRIPTION

Figure 4:
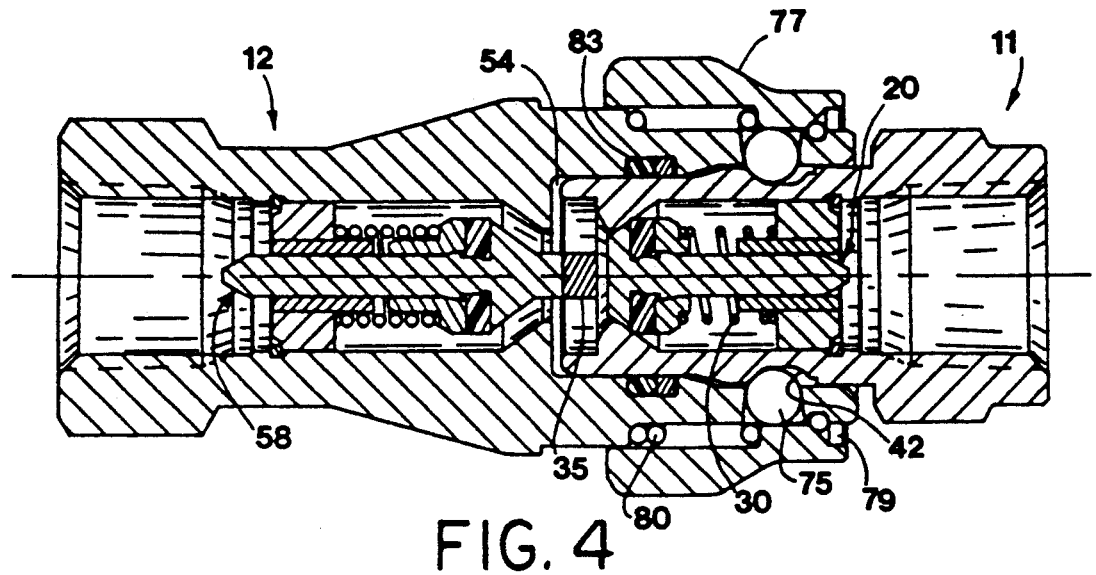
FIG. 4 is a cross-sectional view showing the nipple and coupler connected together.

Referring now in detail to the drawings and initially to FIG. 1, a preferred embodiment of the present invention is illustrated by way of a coupling system indicated generally at 10. The coupling system 10 comprises a nipple 11, i.e., a male coupling, and a coupler 12, i.e., a female coupling. The nipple 11 is intended to be connected to the side of an overall system that is to be maintained at high pressure even when the nipple and coupler are uncoupled. The coupler 12 is intended to be connected to a controlled source of pressurized fluid to be transferred under pressure through the coupler and nipple when connected to one another, the controlled source having provision for venting the coupler 12 to atmospheric or reduced pressure.

The nipple 11 includes a nipple body 15 through which a flow passage 16 extends axially from end to end. The wall 17 surrounding the rear end portion of the passage 16 is threaded as indicated to provide for connection of the nipple to another fluid device such as a hose, pipe, tube, etc.

The nipple body 15, near its forward end, has a radially inwardly projecting throat 18 that is tapered inwardly at its back side to form a seat 19 for a check valve 20. The check valve 20 has a head 21 and a rearwardly extending stem 22 which is supported for axial movement by a three-legged spring and check valve retainer 24. The retainer 24 is located in the passage 16 by a retaining ring 26.

The head 21 of the check valve 20 projects radially beyond the stem 22 and forms at its back side an annular shoulder against which a resilient annular seal 28 is held by a follower 29 and check valve spring 30. The check valve spring 30 surrounds the check valve stem 22 and is interposed between the follower 29 and retainer 24. The spring functions to hold the annular seal 28 against the annular shoulder of the valve head and further functions to bias the check valve 20 towards its closed position with the peripheral edge of the head being urged into engagement with the check valve seat 19. As shown, the peripheral edge of the check valve head 21 and the valve seat 19 are correspondingly tapered. The resilient annular seal 28 projects radially outwardly beyond the peripheral edge of the check valve head for sealing against the check valve seat to prevent leakage of pressurized fluid trapped behind the check valve when the check valve is in its closed position illustrated FIG. 1. Engagement between the relatively rigid valve head and seat prevents overcompression of the resilient annular seal 28.

Further in accordance with the invention, the nipple 11 has at its front end a poppet valve actuator which is, in the illustrated embodiment, in the form of a crossbar 35 that extends diametrically across the passage 16 at the front end of the nipple body 15 as shown in FIGS. 1 and 2. The crossbar 35 is press-fitted or otherwise suitably secured in a counterbore 37 at the forward end of the passage 16. The bottom of the counterbore 37 is formed by the radially inwardly projecting throat 18 of the nipple body 15 which defines at its rear side the valve seat 19. Accordingly, the crossbar poppet valve actuator 35 is disposed just in front of the check valve 20. As will be appreciated, the poppet valve actuator may be otherwise formed. For example, the actuator may be formed by a front end wall of the nipple body that is provided with an opening or openings for passage of fluid therethrough.

The nipple 11 has a conventional external configuration for mating interlocking engagement with the coupler 12. As shown, the nipple has a generally cylindrical nose end portion 39, a raised camming portion 40 and a rear end portion 41 spaced axially from the camming portion 40 to form therebetween a locking groove 42. The locking groove 42 provides for locking of the nipple in the coupler in the manner hereinafter described.

The coupler 12 includes a coupler body 50 having a flow passage 51 extending axially from end to end. The passage 51 generally has a rear end portion 52, an intermediate poppet valve portion 53 and a forward socket portion 54. The wall 56 surrounding the rear end portion 52 of the passage 50 is internally threaded for connection with another fluid device such as a pipe, conduit, tube, etc.

The intermediate poppet valve portion 53 of the coupler body passage 51 houses an axially movable poppet valve 58. The poppet valve 58 has a head 59 and a rearwardly extending stem 60 which is supported for axial movement by a three-legged spring and valve retainer 62. The retainer 62 is located in the passage 51 by a retaining ring 63 and its three legged construction (which is the same as that of the poppet check valve retainer 24) can be seen in FIG. 3.

The head 59 of the poppet valve 58 projects radially beyond the stem 60 and forms at its back side an annular shoulder against which a resilient annular seal 66 is held by a follower 67 and a poppet valve spring 68. The poppet valve spring 68 surrounds the valve stem 60 and is interposed between the follower 67 and retainer 62. The spring functions to hold the annular seal 28 against the shoulder of the valve head and further functions to bias the poppet valve 58 towards its closed position with the peripheral edge of the valve head being urged into engagement with an annular valve seat 70. The passage 51 is inwardly tapered to form the valve seat 70 and, as shown, the valve seat 70 and the peripheral edge of the valve head 59 are correspondingly tapered. The resilient annular seal 66 projects radially outwardly beyond the peripheral edge of the valve head for sealing against the valve seat and thereby effectively prevent the passage of fluid when the poppet valve is in its closed position illustrated in FIG. 1.

The valve seat 70 is located at the rearward end of the socket portion 54 of the coupler passage 51. The socket portion (coupler socket) 54 is configured to receive the nipple 11. The wall 73 surrounding the socket 54 is provided with a circumferential row of equally spaced apart apertures 74 in which respective detents 75 are retained for radial movement. In the illustrated embodiment, the detents 75 are in the form of locking balls which are adapted to releasably engage in the locking groove 42 of the nipple 11 when the nipple is inserted into the coupler socket.

The balls 75 are surrounded by a locking sleeve 77 which is mounted on the coupler body 50 for axial sliding movement. In a forwardly shifted position of the locking sleeve 77, a cylindrical retaining surface at the inner diameter of the locking sleeve engages and holds the balls radially inwardly displaced into the socket 54 and more particularly engaged in the locking groove 42 of the nipple 11 as seen in FIG. 4. In a rearwardly shifted position of the locking sleeve, an annular relief 79 at the forward end of the locking sleeve aligns with the balls to permit radially outward displacement thereof for insertion or withdrawal of the nipple.

The locking sleeve 77 is normally biased towards its forward or locking position by a spring 80 interposed between an internal shoulder of the locking sleeve and an external shoulder of the coupler body 50. Forward movement of the locking sleeve is limited by a retaining ring 81 while rearward movement is limited by bottoming out of the locking sleeve spring 80, as is conventional. With the nipple 11 and coupler 12 connected together as shown in FIG. 4, sealing between the socket 54 and nose end 39 of the nipple 11 is provided by a resilient annular interface seal 83 located in an annular groove in the wall of the coupler socket.

As the nipple 11 is inserted into the coupler 12, the cross bar 35 actuator will engage and open the coupler's poppet valve 58 as shown in FIG. 4. For this purpose the coupler's poppet valve has a reduced diameter nose end 85 which projects into the rear end portion of the coupler socket sufficiently for engagement with the cross bar 35 of corresponding width. As is readily evident, such opening of the coupler's poppet valve 58 is effected by the cross bar actuator independently of the nipple's check valve 20. Consequently, such coupling is effected without having to exert great force as coupling is effected without having to open the nipple's valve that will normally be under high pressure.

Preferably, such opening of the poppet valve 58 in the coupler 12 occurs only after the nose end 39 of the nipple 11 has been telescoped into sealing relationship with the interface seal 83 surrounding the coupler socket 54 to prevent or minimize any escape of fluid from the coupler to the atmosphere during as well as after coupling. To this end, the front end of the poppet valve 58 when closed is axially spaced rearwardly from the plane of the interface seal 83 as seen in FIG. 1, and the cross bar actuator 35 is located substantially flush with the front face 87 of the nipple body 15.

Figure 5:
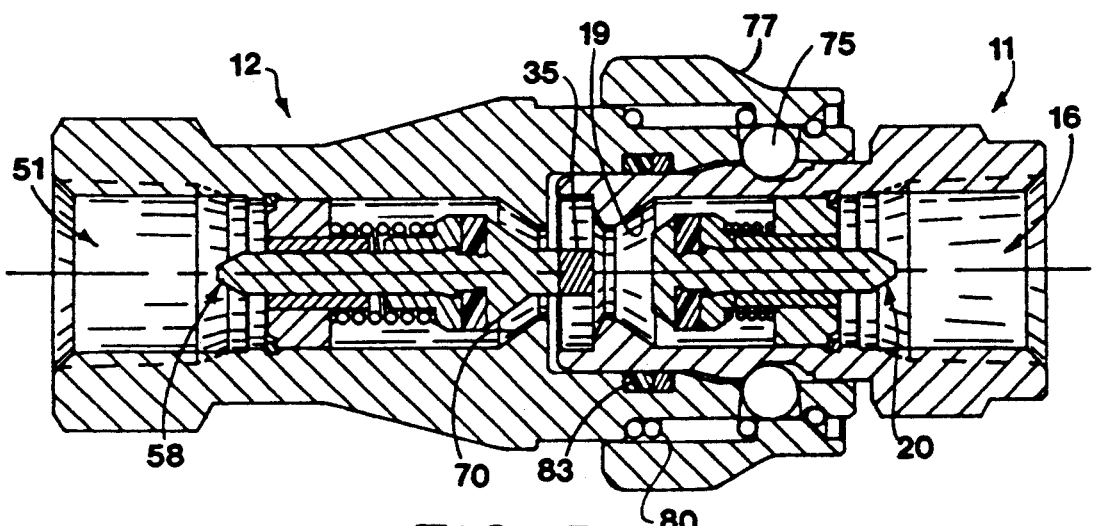
FIG. 5 is a cross-sectional view similar to FIG. 4 but showing the operative members of the nipple and coupler in position to allow fluid flow.

With the nipple 11 and coupler 12 connected together as shown in FIG. 4, pressurized media can be supplied to the coupler to commence transfer of the media through the coupler and nipple. Since the coupler's poppet valve 58 is held open by the cross bar actuator 35, the pressurized media can act on the nipple's check valve 20. When the pressure in the coupler exceeds the pressure acting on the nipple's check valve, i.e., fluid pressure behind the check valve and the relatively small force exerted by the check valve spring 30, the check valve will open as shown in FIG. 5 and the transfer of media will occur. Conversely, the check valve will close and prevent any further transfer of media when the supply of pressurized media to the coupler is ceased and the coupler is vented. The coupler can then be disconnected from the nipple which remains pressurized.

At all times the nipple check valve 20 will allow media flow only from the coupler 12 to the nipple 11. Also, pressure equalization is required to open and close the check valve. This will extend valve seal life by minimizing exposure to the damaging forces that arise in prior art couplings wherein valve seals are mechanically opened under pressure and thereby exposed to high forces and stresses.

As will be appreciated by those skilled in the art, the above described nipple 11 is well suited for high pressure applications, such as compressed natural gas (CNG) vehicles, in which the user would like to couple to a nipple (receptacle) on the vehicle that is under pressure. The nipple may be used to retrofit existing CNG systems by simple substitution for the presently used quick connect nipple and discrete check valve, thereby eliminating the drawbacks associated therewith.

Although the invention has been shown and described with respect to a preferred embodiment, equivalent alterations and modifications will of course occur to others skilled in the art upon the reading and understanding of this specification. For instance, other types of nipple locking devices may be employed other than the illustrated detent locking mechanism, such as, for example, a bayonet-type nipple locking mechanism. The present invention includes all such equivalent alterations and modifications, and is limited only by the scope of the following claims.

What is claimed is:

1. A quick-connect nipple for connecting with a quick-connect coupler including a normally closed poppet valve and a locking mechanism for locking said nipple in the coupler upon axial insertion of the nipple into the coupler, said nipple comprising a nipple body having a passage extending axially between front and rear ends thereof, a check valve mounted in said nipple body for movement between open and closed positions, and poppet valve actuator means separate from said check valve for mechanically engaging the poppet valve of the coupler upon insertion of said nipple into the coupler so as to open the coupler's poppet valve independently of said check valve, and said nipple body being configured with means engageable by the locking mechanism of the coupler for releasably holding said nipple body in the coupler.

2. A nipple as set forth in claim 1, wherein said poppet valve actuator means includes an abutment member fixed in said nipple body forwardly of said check valve in said passage.

3. A nipple as set forth in claim 2, wherein said abutment member is a crossbar that transaxially extends centrally across the front end of said passage in said nipple body.

4. A nipple as set forth in claim 3, wherein said crossbar is fixed in a counterbore in a front face of said nipple body.

5. A nipple as set forth in claim 4, wherein the rearward end of said counterbore is formed by a radially inwardly projecting throat that surrounds said passage in said nipple body and forms at its back side an annular valve seat for said check valve.

6. A nipple as set forth in claim 5, wherein said check valve has a resilient annular seal for sealingly engaging said valve seat and a rigid head portion engaging said valve seat to prevent overcompression of said annular seal.

7. A nipple as set forth in claim 6, wherein said head portion and valve seat are correspondingly tapered.

8. A nipple as set forth in claim 1, wherein said check valve is biased towards its closed position.

9. A nipple as set forth in claim 1, wherein said means for releasably holding said nipple body includes an external locking groove on said nipple body.

10. A quick-connect coupling system comprising a nipple and a coupler; said coupler including a normally closed poppet valve and a locking mechanism for locking said nipple in said coupler upon axial insertion of said nipple into said coupler; and said nipple comprising a nipple body having a passage extending axially between front and rear ends thereof, a check valve mounted in said nipple body for movement between open and closed positions, and poppet valve actuator means separate from said check valve for mechanically engaging said poppet valve of said coupler upon insertion of said nipple into the coupler so as to open said poppet valve independently of said check valve, and said nipple body being configured with means engageable by said locking mechanism of said coupler for releasably holding said nipple body in said coupler.

11. A system as set forth in claim 10, comprising an annular interface seal for sealing between said nipple body and coupler when connected together.

12. A system as set forth in claim 10, wherein said poppet valve actuator means includes an abutment member fixed in said nipple body forwardly of said check valve in said passage.

13. A system as set forth in claim 12, wherein said abutment member is a crossbar that transaxially extends centrally across the front end of said passage in said nipple body.

14. A system as set forth in claim 13, wherein said crossbar is fixed in a counterbore in a front face of said nipple body.

15. A system as set forth in claim 14, wherein the rearward end of said counterbore is formed by a radially inwardly projecting throat that surrounds said passage in said nipple body and forms at its back side an annular valve seat for said check valve.

16. A system as set forth in claim 15, wherein said check valve has a resilient annular seal for sealingly engaging said valve seat and a rigid head portion engaging said valve seat to prevent overcompression of said annular seal.

17. A system as set forth in claim 16, wherein said head portion and valve seat are correspondingly tapered.

18. A system as set forth in claim 10, wherein said check valve is biased towards its closed position.

19. A system as set forth in claim 10, wherein said means for releasably holding said nipple body includes an external locking groove on said nipple body.

20. A method of retrofitting a quick-connect coupling system including a coupler connected to a supply line and a nipple connected via a check valve to a pressurized conduit, the coupler and nipple each including a poppet valve mechanically opened by the poppet valve in the other when the coupler and nipple are interengaged, the method comprising the step of replacing the nipple with a conversion nipple comprising a nipple body having a passage extending axially between front and rear ends thereof, a check valve mounted in the nipple body for movement between open and closed positions, and a poppet valve actuator separate from the check valve for mechanically engaging the poppet valve of the coupler upon insertion of the nipple into the coupler so as to open the coupler's poppet valve independently of the check valve, and the nipple body being configured for engagement by a locking mechanism in the coupler for releasably holding the nipple body in the coupler.

* * * * *